United States Patent [19]

Covic et al.

[11] 4,277,685

[45] Jul. 7, 1981

[54] ADJUSTABLE COLLIMATOR

[75] Inventors: John Covic, Wickliffe; Glen Leininger, Suffield; Roland W. Carlson, Lyndhurst, all of Ohio

[73] Assignee: Ohio-Nuclear, Inc., Solon, Ohio

[21] Appl. No.: 914,361

[22] Filed: Jun. 12, 1978

[51] Int. Cl.³ .................... G03B 41/16; G21F 5/04
[52] U.S. Cl. ................... 250/445 T; 250/511
[58] Field of Search ............... 250/505, 511, 512, 513, 250/445 T

[56] References Cited

U.S. PATENT DOCUMENTS

| | | | |
|---|---|---|---|
| 2,851,610 | 9/1958 | Akashi | 250/511 |
| 3,569,712 | 3/1971 | Avakoff | 250/511 |
| 3,638,231 | 1/1972 | Le Poole | 250/511 |
| 3,784,818 | 1/1974 | Stoeckel | 250/363 |
| 3,940,625 | 2/1976 | Hounsfield | 250/445 T |
| 3,947,689 | 3/1976 | Wagner | 250/512 |
| 3,996,467 | 12/1976 | Froggatt | 250/445 T |
| 4,018,716 | 4/1977 | Fitzsimmons | 250/511 |
| 4,066,901 | 1/1978 | Seppi | 250/511 |
| 4,071,771 | 1/1978 | Covic | 250/511 |

Primary Examiner—Craig E. Church
Attorney, Agent, or Firm—Fay & Sharpe

[57] ABSTRACT

In a rotating fan beam tomographic scanner there is included an adjustable collimator and shutter assembly. The assembly includes a fan angle collimation cylinder having a plurality of different length slots through which the beam may pass for adjusting the fan angle of the beam. It also includes a beam thickness cylinder having a plurality of slots of different widths for adjusting the thickness of the beam. Further, some of the slots have filter materials mounted therein so that the operator may select from a plurality of filters. Also disclosed is a servo motor system which allows the operator to select the desired fan angle, beam thickness and filter from a remote location. An additional feature is a failsafe shutter assembly which includes a spring biased shutter cylinder mounted in the collimation cylinders. The servo motor control circuit checks several system conditions before the shutter is rendered openable. Further, the circuit cuts off the radiation if the shutter fails to open or close properly. A still further feature is a reference radiation intensity monitor which includes a tuning-fork shaped light conducting element having a scintillation crystal mounted on each tine. The monitor is placed adjacent the collimator between it and the source with the pair of crystals to either side of the fan beam.

28 Claims, 7 Drawing Figures

ADJUSTABLE COLLIMATOR

BACKGROUND OF THE INVENTION

This invention relates to radiographic apparatus for use in computerized axial tomography. It is particularly advantageous in rotating fan beam type tomographic scanners and will be described with particular reference thereto although it will be appreciated that the invention has broader aspects. For example, the radiation beam dimension changing system and the source radiation intensity measuring system are applicable to virtually all radiographic scanners including traverse and rotate type tomographic scanners. Other aspects of the invention will find varying degrees of applicability to other scanners.

Rotating fan beam tomographic scanners normally comprise a circular area in which a patient or object to be examined is placed. A source of X or gamma radiation is mounted to move in an arc adjacent to the patient circle in order to rotate a beam of radiation at least partially around the patient. An arc of radiation detectors for measuring the intensity of radiation passing through the patient are positioned opposite the patient circle from the source of radiation. A processing means transforms the intensity measurements of the arc of detectors into a visual display of the planar area of the patient scanned.

For safety reasons and to meet U.S. Government regulations, the radiation source must be shielded in a housing or enclosure system which essentially traps all radiation except that needed for the tomographic scan. To define the cross sectional dimensions of the radiation beam needed for the scan, tomographic scanners have used a variety of collimators. Also, a variety of shutters and radiation tube controls have been used to block completely the radiation. Examples of prior art collimators and shutters are shown in U.S. patent application Ser. No. 786,358 of Joseph B. Richey, et al., filed, Apr. 11, 1977, Haupt U.S. Pat. No. 2,542,196, Akaski, et al. U.S. Pat. No. 2,851,610, Hura U.S. Pat. No. 3,829,701, Sperry U.S. Pat. No. 3,384,751, and Martin U.S. Pat. No. 3,275,831.

Excessive radiation can cause two types of image degradation. The first is scattered radiation. Stray radiation which is misdirected may, strike physical parts of the scanning equipment and areas of the patient not under examination. This stray radiation may be reflected one or more times and eventually impinge upon the radiation detectors. Because unknown detected stray radiation travels in an unknown path through objects of unknown attenuation, it creates erroneous data signals and noise. This scatter can reduce the resolution of the image produced on the visual display.

A second type of image degradation from excessive radiation is caused by the "penumbra effect." The radiation beams are emitted from a very small area on a radiation tube anode known as the focal point. Theoretically, this spot can be so small and the bombardment of it with electrons so precise that the beam emitted forms a precise and regular conical pattern of "on focus" radiation. In practice, however, the spot is a larger area than a theoretically optimized point and the tube emits a penumbra or band of so-called "off-focus" radiation from areas around the spot. The penumbra or off-focus radiation is another source of image degradation.

A further cause of image degradation is fluctuations in the intensity of radiation produced by the source of radiation. If the intensity of the source of radiation increases or decreases, the arc of detectors measures a similar increase or decrease. The processing system would erroneously attribute the variation in intensity measured by the detectors to variations in the attenuated radiation. This misreading of the attenuation properties causes inaccuracies in the final visual image produced.

In the past, collimator and filter assemblies have been complex, bulky, and inflexible. Changing the collimator size, or inserting a new filter material into the beam path, was a cumbersome and time-consuming operation. In many cases, manual removal and disassembly or replacement of the structure was required for any change.

This manual task required an extended interruption in the scanning of patients and down time of the machine.

In prior art computerized axial tomographic scanners, it was common to interrupt the scanning procedure to check the reference level of radiation produced by the radiation source. In many scanners, it was necessary to remove the object being examined so that the source of radiation could strike the detectors directly. In others, it was necessary to superimpose a detector into the path of radiation; in yet others, a dummy attenuation material inserted between the source and the detectors. Such methods of checking the radiation intensity were not only disruptive to scanning procedure but only intermittently checked the radiation levels.

Another approach was positioning a radiation detector in a position in which it could view the X-ray tube. The present invention contemplates a new and improved apparatus which overcomes the above problems and others, yet provides a collimator assembly which is simple, easy to operate, and versatile.

In accordance with the present invention, a radiographic scanning apparatus with an adjustable collimator assembly is provided. A plurality of collimation members are assembled for varying at least one cross sectional physical dimension of the beam of radiation. Further provided is a control mechanism for causing the collimation members to vary the at least one dimensions without removing the collimator apparatus.

In accordance with another aspect of the invention, a tomographic scanning apparatus is provided wherein a radiation intensity measuring detector is located adjacent the radiation beam for continuously monitoring its intensity. In a more limited aspect, the radiation intensity measuring detector has dual detection elements mounted closely adjacent the collimator members on opposite sides of the beams to measure continuously the average intensity of radiation across the beam without interferring with the beam.

This invention also includes a radioscopic scanning apparatus wherein the control mechanism includes circuitry for automatically and remotely changing filters and cross sectional dimensions of a collimator. A fail-safe shutter assembly for protecting a patient from excessive radiation in an equipment malfunction is also provided.

The collimator assembly of the present invention is easily fitted to and readily usable with conventional radiographic scanning apparatus.

Other benefits and advantages of the present invention will become apparent from the description of the preferred embodiment.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof.

DESCRIPTION OF THE PREFERRED EMBODIMENT

Referring now to the drawings which are for the purposes of illustrating the preferred embodiment of the invention only and not for the purposes of limiting same.

Figure 1:
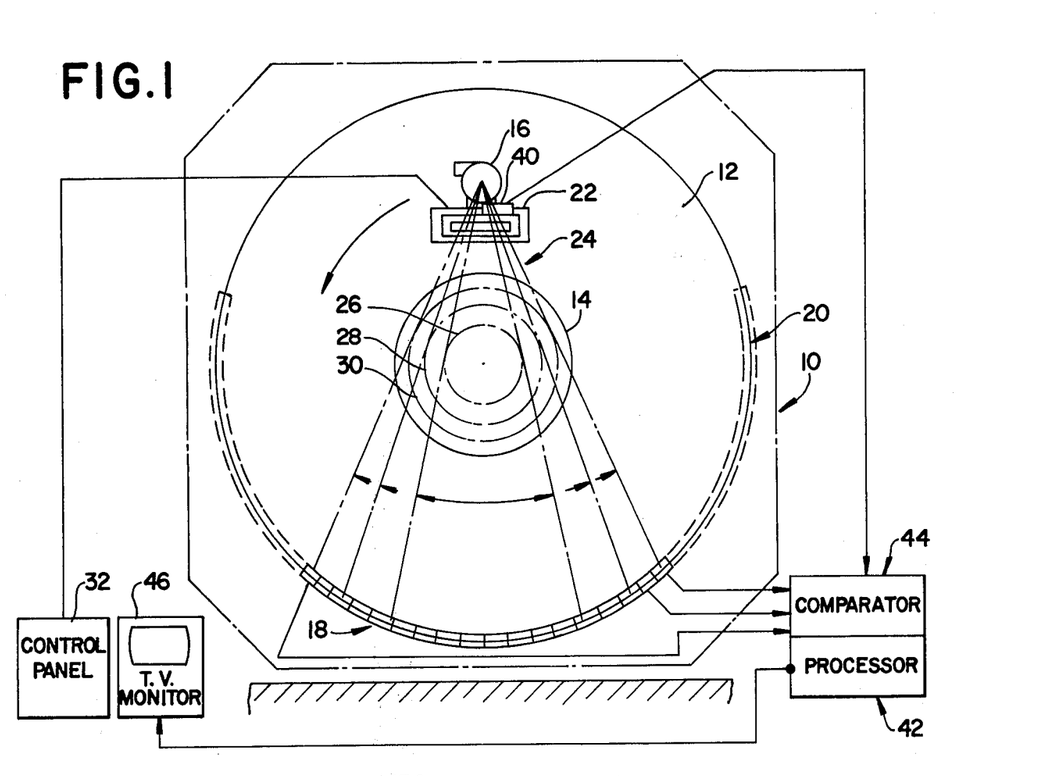
FIG. 1 is an overall system view of a computerized tomographic scanning system in combination with a source collimator in accord with the present invention.

FIG. 1 shows the general arrangement of a rotating fan beam type radiographic scanner incorporating the present invention. It consists of a stationary gantry 10 on which is mounted a rotatable member 12. In the center of the rotatable member is an opening 14 for receiving a patient or object to be examined. On the rotatable member is a source of radiation 16 mounted for rotation concentrically about the center of the patient opening.

An arc of radiation detectors 18 is disposed along the periphery 20 between the gantry 10 and the rotatable member 12. The radiation detectors 18 are positioned to receive radiation passing through the patient receiving opening. The arc of radiation detectors may be a relatively short arc mounted on the rotatable member 12 such that the detectors rotate with the radiation source remaining across the patient from the source. Alternately, a relatively long arc of detectors may be mounted on the gantry circumscribing much or all of the periphery 20 such that as the source rotates stationary detectors remain positioned across the patient from the source.

A collimator assembly 22 is mounted on the rotatable member 12 contiguous with the radiation source 16. The collimator assembly variably defines the cross sectional dimensions of the beam of radiation. The beam dimensions can be described in terms of the fan angle 24 or in terms of scan circle diameter. That is different fan angles span different widths or scan circles at the patient position.

The fan angle and the thickness may be continuously or incrementally adjustable. It has been found convenient to select fan angles such that the edges of the fan beam are tangent to a 25 centimeter diameter scan circle 26, a 40 centimeter scan circle 28, or a 50 centimeter scan circle 30. In use, the operator would determine the smallest scan circle necessary to encompass the region of interest in the patient or the part of the patient examined, e.g. head, torso, arm, etc.

Normally the region of the patient examined is a thin planar slice. Within reason, many thicknesses may be chosen, but it has been found convenient and desirable to limit the selection to 4 millimeters, 7 millimeters, and 10 millimeters.

The collimator assembly may further impose filter materials into the path of the radiation beam such as aluminum, copper, or tungsten foils as well as other filter materials.

The selection of the fan angle or scan circle diameter, the beam thickness and filter material may be remotely selected from a control panel 32. The control panel, as will be described in greater detail hereinafter, enables the operator to actuate servo motor means within the collimator assembly for causing the selected beam dimensions and filtering.

Also illustrated in FIG. 1 is a source radiation intensity measuring means or reference detector 40 for measuring the intensity of radiation before it reaches the patient. Tomographic scanners customarily derive their data from the amount of radiation absorbed by the body, i.e. the decrease in intensity of the beams of radiation due to attenuation as the beams pass through the patient.

Measuring means 40 measures the radiation intensity before entering the scan circle in which a patient is normally located. The arc of detectors 18 measures the intensity after the radiation beams pass through the patient. The fan beam of radiation being divergent, an adjustment must be made for the difference in cross sectional area of the beam at the monitoring means 40 compared to the cross sectional area at the detector arc 18. Data from both of these detectors is channeled to a processing means 42 which may be designed in accord with the signal processing circuitry disclosed in copending application Ser. No. 838,084, filed Sept. 30, 1977 or in accord with the article "Reconstruction of a Head Section", IEEE Transactions on Nuclear Science, June 1974, L. A. Shepp and B. F. Logan, or the article "Reconstruction from Divergent Ray Data", State University of New York at Buffalo Tech. Report No. 92, January 1975, A. V. Lakeshminasayan or in accord with the teachings of U.S. Pat. No. 3,924,129. Included in the processor 42 is a comparator means 44 for adjusting the data from the arc of radiation detectors 18 by the pre-patient intensity measured by means 40.

The comparator means 44 may adjust the signals in a variety of ways. For example, the comparator means may subtract the intensity data measured by the detectors along arc 20 from the intensity measured by means 40 to form signals indicative of the actual absorption or decrease in intensity. More commonly, the comparator means may subtract signals indicative of the logarithm of the radiation intensity at detector arc 18 and means 40 to represent the attenuation as the ratio of the intensity before and after passing through the patient.

The processing means 42 transforms the attenuation data which it receives into a representation of the slice of the patient through which the fan shaped beam of radiation passed. This representation may be in the form of a visual display on a television monitor 46.

Figure 2:
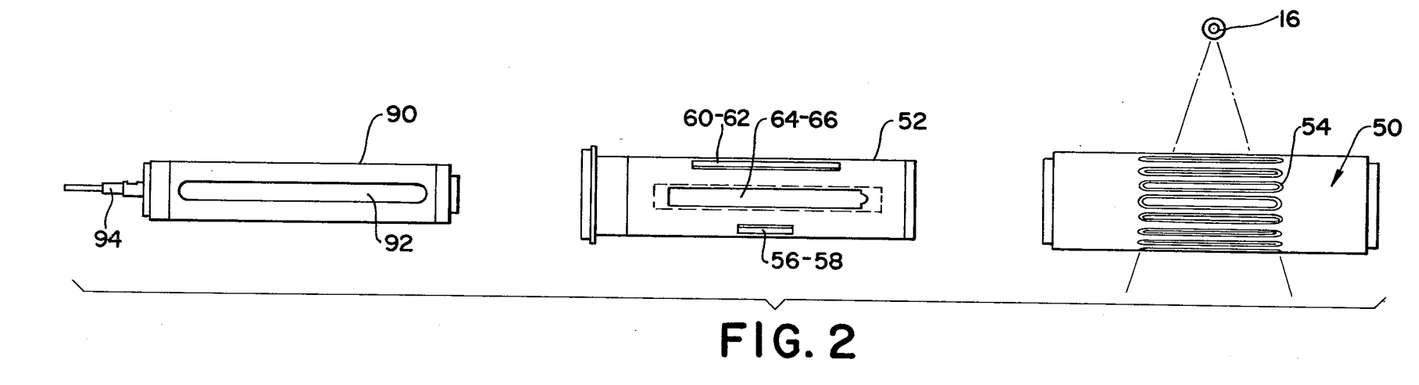
FIG. 2 is an exploded view of a collimator and filter structure in accord with the present invention.

FIG. 2 shows an expanded view of the thickness and fan angle adjusting means of the preferred embodiment. This means comprises a pair of concentric cylinders 50 and 52. The source of radiation 16, located above cylinder 50 produces a cone of radiation which is constrained within an enclosing means such as a housing made of radiation impermeable material. The housing has an outlet aperture which allows the radiation to strike the top of cylinder 50. The cylinder 50 has a plurality of longitudinal slots 54 around its perifery. The slots 54 are paired in order to form an inlet slot and a diametrically opposed outlet slot. For different angular positions of cylinder 50, different pairs of the slots 50 form the inlet and outlet slots through which the beam of radiation passes. The width of each pair of the slots varies to regulate the selectable thickness of the resulting fan beam of radiation. A detector collimator may additionally be used. In this manner the patient is not subjected to significantly more radiation than impinges upon the detectors.

Because the source of radiation provides a conical beam of radiation, the thickness of beam will diverge albeit to a small extent after passing through the cylinder 50. In the preferred embodiment, the width of the slots are selected such that at the center point of the patient circle, the thickness of the fan beam may be slightly in excess of 4, 7, or 10 millimeters. Thus, the width of one slot of each pair is slightly less than 4, 7 or 10 millimeters, respectively. Other thickness, of course, may also be used. Although either or both the inlet and outlet slit of each pair may be so gauged, the preferred embodiment gauges the width of the outlet slot. The inlet slot is sized sufficiently large that it does not further restrict the beam thickness.

The second cylinder 52 sized to be mounted concentrically within cylinder 50 controls the fan angle. The cylinder 52 has three pairs of slots 56–58, 60–62, and 64–66. The three inlet slots 56, 60, and 64 each have a length that it will restrain the divergence of the fan beam to such angles that it just spans patient circles of 25, 40, and 50 centimeters respectively. The outlet slots 58, 62, and 66 are sufficiently large that they do not modify the fan angle defined by the inlet slots. Alternately the outlet rather than or in addition to the inlet slots may be used to define the fan angle.

The width of slots 56–66 are wide enough that when cylinder 52 is placed concentrically within cylinder 50, these slots do not interfere with the thickness selection. Similarly, the slots of cylinder 50 are long enough that they do not interfere with the fan angle selection.

Figure 3:
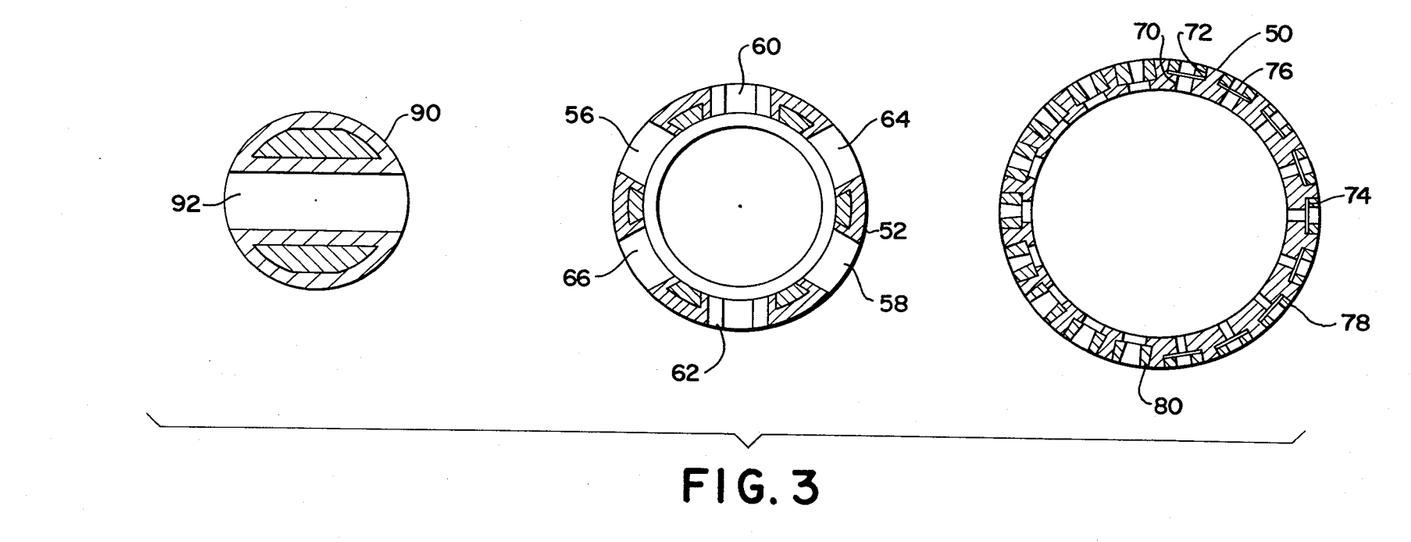
FIG. 3 is a cross sectional view of the elements of FIG. 2.

In the preferred embodiment, cylinder 50 also carries a selection of filter elements. As shown in FIG. 3, each of the slots 54 has an inner bore 70 and a larger outer bore 72. Resting on a ledge 74 between the inner and outer bores of one slot of each pair, is a filter means 76. The filter means are metallic foils, such as aluminum, copper, and tungsten, selected for their ability to shield all but a known spectrum of radiation. The filters are held in place by a retaining insert 78. Similar inserts 80 are placed in the outlet bores to define the thickness of the beam.

Although cylinder 50 may be designed to create most any number of filter means and beam thickness combinations, the preferred embodiment provides a selection of three thickness and three filter foils. In order that any combination of thickness and filter may be chosen, nine parts of slots are provided—one for each thickness with each filter material.

It will be appreciated that other numbers of cylinders may be used. For example all the fan angle, thickness and filter selection slots could be placed on a single cylinder. In the preferred embodiment, where there are three choices for each variable, this would necessitate twenty-seven slots on one cylinder. However, for a smaller number of available selections, a single cylinder would be more easily managed.

Alternately a larger number of cylinders could be used. For example, the filter and thickness variables could be mounted in separate cylinders. More cylinders are especially describable when a large number of selections are to be permitted. Two or more cylinders could even be provided for a single variable.

A further alternative is to use a continuously variable fan angle selection cylinder. If slots 56, 60, and 64 were replaced with a large tapered opening, then any fan angle between that defined by the widest point of the opening and that defined by the narrowest point could be selected.

Many other alternatives are immediately apparent, such as the use of linearly or rotatably slideable plates instead of cylinders.

A cylindrical shutter means 90, a third concentric cylinder, is positioned rotatably inside cylinder 52. Shutter 90 has a large passage 92 passing all the way through the center. Passage 92 is long enough that it does not decrease the fan angle and wide enough that it does not interfere with the thickness set by cylinders 50 and 52. Shutter 90 is biased to the closed position i.e., with passage 92 perpendicular to the radiation path between the source and its patient. In this manner, the shutter will block the radiation from striking the patient unless specifically held open. A control shaft 94 attached to shutter 90 controls the movement of the shuter and between its open and closed position.

Figure 4:
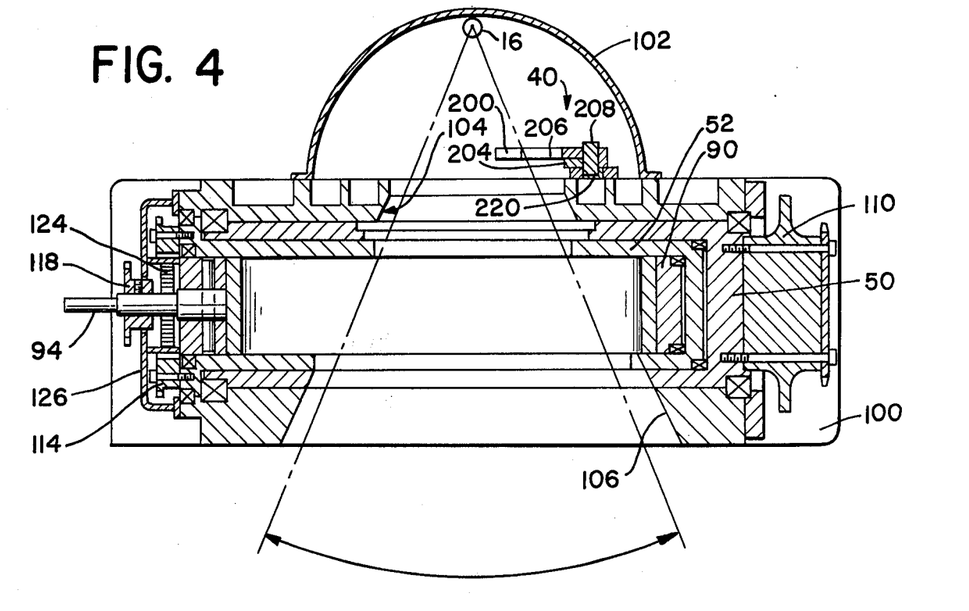
FIG. 4 is a cross sectional view of an assembled collimator in accord with the present invention.

FIG. 4 shows the cylinders 50, 52, and 90 assembled into a stationary housing 100. The housing 100 surrounds the cylinders and is attached to enclosure means 102 which surrounds the source of radiation 16. An entrance opening 104 which is also the outlet aperture of the enclosure means is sufficiently wide and long that a radiation beam of width and length sufficient to form a fan beam with the greatest selectable fan angle and thickness enters the cylinder assembly. The housing also has an exit 106 which is again wide enough and long enough for the largest possible fan beam to exit. Optionally, in opening 104 there may be a series of rods or plate with a series of slots to break the beam into an array of finger-like beams.

Cylinders 50 and 52 and shutter 90 are concentrically mounted within housing 100. Pairs of bearings are placed between the cylinders, between the shutter and cylinder 52 and between cylinder 50 and the housing for non-binding rotation of the rotatable parts. The fit of the shutter and cylinders is such that radiation from source 16 only exits from housing 100 through exit 106.

Mounted on one end of the cylinder 50 is a sprocket 110. The sprocket may be integral with cylinder 50 or attached by any suitable mounting means. The sprocket 110 is driven by a thickness and filter control means 112 of FIG. 5 to rotate cylinder 50 bringing the selected beam thickness slot and filter means into the proper orientation. On the oppposite end of housing 110 is another sprocket 114 attached to cylinder 52 integrally or with bolts, or with other appropriate fastening means. Sprocket 114 is similarly connected with a fan angle control means 116 to rotate the selected fan angle slot into the proper orientation. Similarly, there is a third sprocket 118 attached to the shaft 94 of shutter 90 and to shutter control means 120 for rotating the shutter between its open and closed position. Alternately, sprockets 110 and 114 and control means 112 and 116 may be replaced with manually operable knobs or dials. In this alternative, the fan angle, thickness, and filter can be selected manually.

Also illustrated in FIG. 4 is a biasing means 124 for the shutter. This biasing means comprises a coil spring attached to shutter control rod 94 and a fixed block 126 attach to housing 100 for mechanically biasing the shutter to the closed position. This biasing means forms part of fail-safe system for closing the shutter at all times that the shutter control 120 does not affirmatively hold the shutter open.

Figure 5:
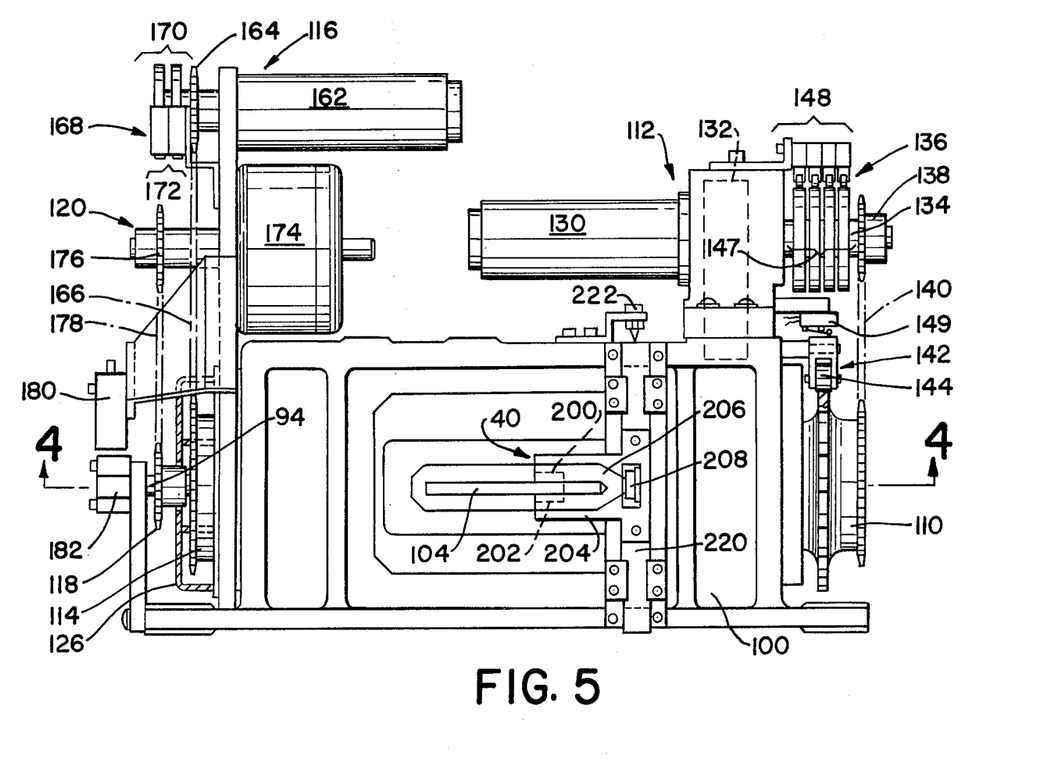
FIG. 5 is a top view of the assembled collimator of FIG. 4.

The thickness and filter control means 112 is shown in detail in FIG. 5, a top view of the collimator housing 100. This control means comprises a motor means 130 mounted on housing 100. The output shaft of electric motor 130 is connected to a rotational position fixing means 132 for limiting rotational output to precise rotational increments for positioning the thickness determining slots of cylinder 50.

The rotational position fixing means 132 is connected by shaft 134 to a rotational position monitoring means 136 and a drive sprocket 138. The drive sprocket 138 is connected to sprocket 110 with a chain 140 to convey the rotational movement to cylinder 50.

Associated with sprocket 110 is a position locking means 142 for limiting the rotation of cylinder 50 to nine, in the preferred embodiment, stable positions. The position locking means 142 consists of a spring biased detent or cam follower 144 mounted on housing 100. The detent 144 engages cam surface 146 which includes nine indentations arranged about 180° of the cam surface. Thus, as chain 140 drives sprocket 110, cam 146 and cam follower 144 intermittently locks cylinder 50 into each of its nine stable positions, i.e. positions in which one pair of slots 52 is in proper alignment.

The monitoring means 136 includes cam means 147 composed of a set of eccentric cams mounted on shaft 134 for rotation therewith. The monitoring means further includes a set of switches 148 which engage the cams mounted on housing 100. By appropriately arranging the eccentricity of the cam means, on-off switches in the switch means are caused to produce a binary encoded signal indicative of the thickness slot and filter means of cylinder 50 which are imposed into the radiation path through housing 100. A further switch 149 associated with cam follower 144 indicates whether cylinder 50 is in or in between the stable positions.

Figure 6:
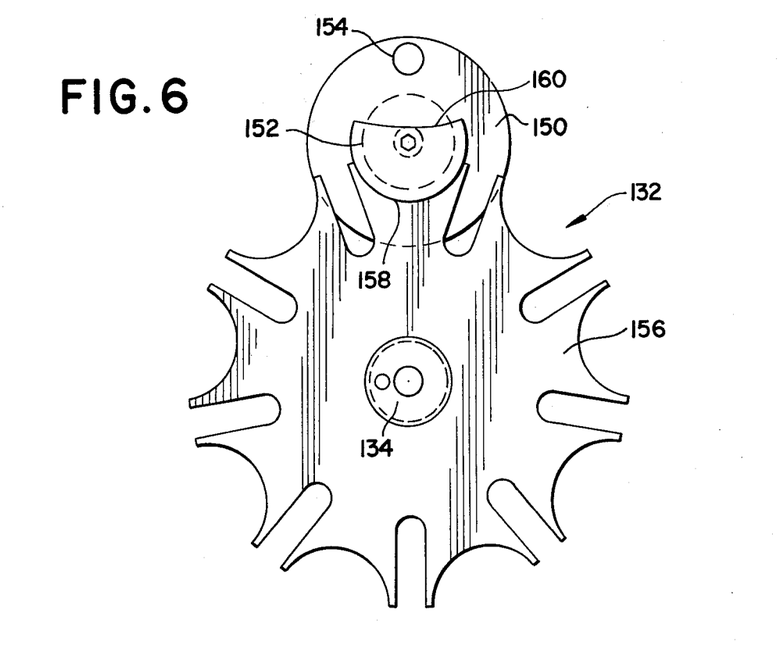
FIG. 6 is a detail of a Geneva wheel control mechanism of FIG. 5.

One embodiment of rotational position fixing means 132 is shown in detail in FIG. 6. The illustrated assembly includes a wheel 150 mounted on the drive shaft of motor means 130. (FIG. 5.) Mounted for rotation with wheel 150 are a crescent-shaped locking cylinder 152 and a pin 154. Cooperating with the cylinder 152 and pin 154 is a Geneva wheel 156 which is attached to shaft 134.

Each full rotation, more or less, of motor means 130 causes shaft 134 to assume successively one of nine precisely determined positions. In operation, rotation of wheel 150 causes the locking surface 158 of cylinder 152 to disengage the Geneva wheel as pin 154 engages one of the slots. As wheel 150 continues to turn, cut away surface 160 allows the pin 154 to turn the Geneva wheel. After one ninth rotation of shaft 134, pin 154 disengages the Geneva wheel and locking surface 158 again locks the Geneva wheel against rotation. Continued rotation of wheel 150 for over one half a rotation does not effect the position of shaft 134. Thus the rotation position fixing means 132 together with the position locking means 142 allows very precise positioning of cylinder 50 even if motor means 130 is subject to large amounts of coasting.

Fan angle control means 116 comprises a motor means 162 for driving the fan angle cylinder 52. The motor means is interconnected with cylinder 52 with a sprocket 164 which is connected with a chain 166 to sprocket 114. A fan angle cylinder rotational position monitoring means 168 comprising cam means 170 and a switch means 172 produces a signal indicative of the angular orientation of sprocket 164, hence of cylinder 52. By using a pair of appropriately oriented eccentric cams mounted for rotation with sprocket 164 and a pair of on-off switches mounted on the housing the switch means 172 can generate a binary encoded signal indicative of the fan angle slots of cylinder 52 which are imposed into the path of radiation through housing 100.

Shutter control means 120 includes a solenoid motor means 174 connected by a sprocket 176 and chain 178 to sprocket 118 of shutter 90. Actuation of solenoid 174 moves the shutter to the orientation in which radiation passing from inlet 104 to exit 106 passes unimpeded through passage 92.

Shutter position switches 180 engage cam means 182 attached to shutter control rod 94 to produce output signals indicating that the shutter is open and that the shutter is closed. By positively indicating both the open and the closed condition, a failsafe system which protects against the shutter stocking in an intermediate position can be provided. This fail-safe system will be described below in reference to FIG. 7.

The radiation intensity measuring means 40 is shown in a side view in FIG. 4 and a top view in FIG. 5. As described above, the radiation intensity measuring means measures the reference level of radiation adjacent the source prior to the radiation passing through the patient. Means 40 includes radiation sensitive energy conversion means 200 and 202, such as scintillation crystals, for converting radiation energy into light energy supported on a lead base 204. Abutting the energy conversion means is a branched light conducting means 206 for conveying the light energy to a transducer means 208 for producing a signal indicative of the intensity of radiation striking the energy conversion means.

In the preferred embodiment the branched light conducting means is a tuning fork shaped piece of Lucite which conveys light from scintillation crystals 200 and 202 to a photomultiplier tube 208. The tines of the tuning fork are spaced so that the scintillation crystals can be spaced closely to the swath of radiation which will pass through 104 the inlet opening of the housing or outlet aperture of the enclosing means, but not so close as to interfere with the fan shaped beam of radiation being defined. The output signal from the photomultiplier tube may be modified by an amplifier with a gain suitable to adjust the signal for the diverging cross sectional area of the fan beam and may be converted by a log amplifier to the logarithm of the intensity. As discussed above this output signal is conveyed to a comparator circuit 44 of processor 42 for adjusting for fluxuation in source intensity the intensities used in producing an image of a region of the patient.

To protect against errors caused by stray light or radiation, intensity measuring means 40 is wrapped in black plastic and to protect against other radiation caused errors all but the surface of the scintillation crystals facing the source is wrapped with lead foil.

The intensity measuring means further includes a position assembly for centering the scintillation crystals about the radiation which is collimated into the fan beam. This positioning means includes a slide 220 slideably mounted on housing 100 to which platform 204 is attached. A threaded screw or micrometer 222 is used to shift slide 220, hence crystals 200 and 202 until the desired position is reached.

It will be appreciated that using a pair of similar crystals arranged on opposite sides of the fan beam creates an averaging effect which interpolates the monitored intensity to generate an approximation of the intensity in the fan beam. The use of only a single crystal would loose the averaging effect but would still produce an indication of intensity. Further, the intensity averaging effect can be increased by using longer or multiple crystals disposed around the fan beam or by using a plurality of intensity measuring means 40.

Additionally, it will be appreciated that the intensity measuring means need not use a radiation-to-light-to-electrical conversion process. Rather it may convert radiation directly to the energy form used by processor 42. Solid state radiation detectors which convert radiation energy directly to electric energy are known.

Figure 7:
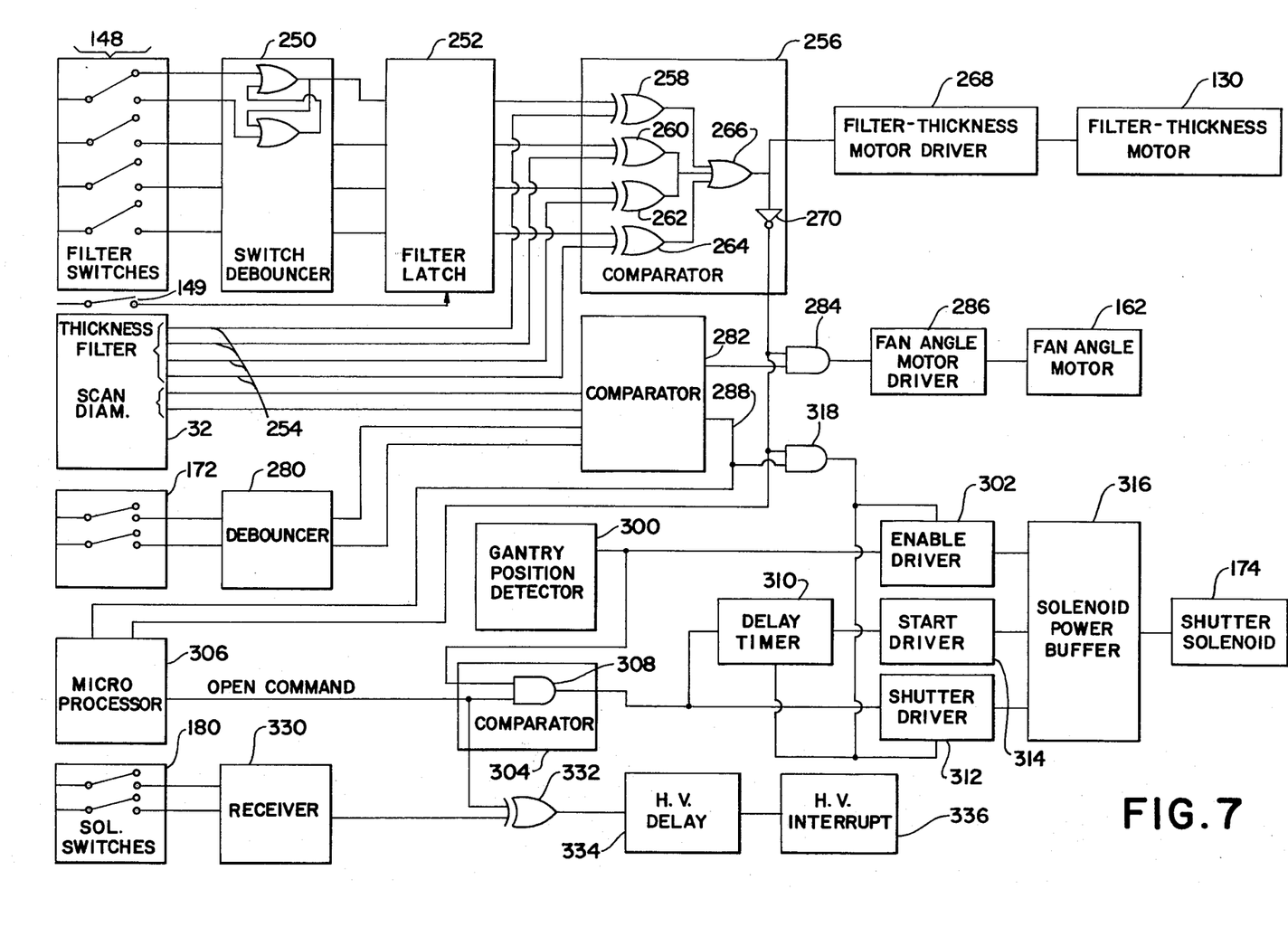
FIG. 7 is a block diagram of an electronic control circuit for a collimator in accordance with the present invention.

FIG. 7 shows a control circuit for controlling the operation of the filter-thickness motor means 130, fan angle motor means 162, and the shutter solenoid 174. The filter-thickness cylinder position monitoring switch means 148 of FIG. 5 provides a four bit encoded signal indicative of the position of cylinder 52. A switch debouncing means 250 for producing only a single output pulse of known duration regardless of whether the switch contacts bounce or how long they are closed is made up of crosscoupled NAND gates. A latch circuit 252 strobed by switch 149 each time cylinder 50 is in one of the stable positions stores the four bit signal indicative of the last filter-thickness cylinder position signal received from switches 148 through switch debouncer 250 during rotation of motor means 130. At a selection means including front control panel 32, the operator selects the desired filter and beam thickness which selection generates a second four bit encoded selection signal on lines 254. This signal is compared with the four bit signal from the latch circuit 252 by a comparator 256.

Comparator 256 includes four EXCLUSIVE-OR gates 258, 260, 262, and 264, one input of each from latch 252 and the other from control panel 32. The output of an EXCLUSIVE-OR gate is high if there is no coincidence on its inputs, i.e. if the inputs are neither both high or both low. The four outputs from EXCLUSIVE-OR gates 258-264 are combined by OR gate 266, the output of which will be high whenever the position of the filter-thickness cylinder is different from the position preselected on the front control panel.

The output of OR gate 266 of comparator 256, is connected to a filter-thickness motor driver 268 which amplifies a high output to a voltage appropriate for driving the filter-thickness cylinder drive motor 130. The output of OR gate 266 also is connected to an inverter 270 which provides a second inverted output. The second output becomes high when the filter cylinder moves into coincidence with the selected position on the front control panel 32. Inverter 270 thus provides an "in position" signal.

Fan beam angle cylinder position indication switches 172 provide a binary output to a switch debouncer 280 which in turn provides a two bit signal indicative of the position of the scan diameter cylinder to a comparator 282. This two bit signal is compared by comparator 282 with a two bit signal from the front control panel 32 indicative of the fan angle (scan diameter) selected. Comparator 282, when the two fan angle signals are not in coincidence, provides a high output signal to one input of an AND gate 284. The other input of AND gate 284 is connected to inverter 270 to receive a filter-thickness cylinder "in position" signal. The output of AND gate 284 is amplified by a fan angle motor driver 286 which, when there is a high output from AND gate 284, provides the appropriate voltage to drive a fan angle motor 162. In this manner, the fan angle cylinder is blocked from rotation by inverter 270 until after the filter-thickness cylinder has been properly positioned. Like comparator 256, comparator 282 also produces an "in position" signal, line 288.

A shutter control means includes a gantry position detector 300 which counts clock pulses as the gantry 12 is rotated counter clockwise to the starting position for a tomographic scan. When the gantry reaches it proper starting position, a sufficient number of pulses will have been counted to cause an enable signal to be sent to enable driver 302 and to comparator 304.

A microprocessor 306 in the front control panel receives the "in position" signals from comparators 256 and 282 and responsive thereto produces an open command signal which starts the shutter opening procedure. The open command signal is received by comparator 304 along with the gantry position enable signal. An AND gate 308 in comparator 306 only allows an output signal from the comparator when it receives both an open command signal and a gantry position enable signal.

A command to open the shutter from comparator 304 starts a delay timer 310 and activates a shutter driver 312. After time sufficient to guard against momentary erroneous signals, delay timer 310 enables a start driver 314. The enable driver 302, start driver 314, and shutter driver 312 produce enable, start, and shutter signals respectively, to a solenoid power buffer 316. Solenoid power buffer 316 along with enable driver 302, start driver 314, and shutter driver 312 forms a shutter driver means which supplies power to the shutter motor means, solenoid 174. To prevent the shutter from opening while either the filter-thickness or fan angle cylinder is rotating delay timer 310, enable driver 302, and shutter driver 312 must be enabled by AND gate 318 which is sensitive to the proper positioning of filter-thickness cylinder 50 and fan angle cylinder 52.

Safety switches 180 as discussed above are actuated by shaft 94 of the shutter assembly—one of the switches when the shutter is in its open position, and the other of the switches when the shutter is in its closed position. These switches are connected to a receiver 330 which determines whether the shutter is open, closed or somewhere in between. Receiver 330 along with the open command input of comparator 304 are connected to the inputs of a shutter position comparison means in the form of an EXCLUSIVE-OR gate 332. EXCLUSIVE-OR gate 332 determines whether the shutter is actually in the position in which the command signal from microprocessor 306 indicates it ought to be. If the signals both indicate that the shutter should be and is open or should be and is closed, there will be no output from EXCLUSIVE-OR gate. However, if the signals are different, EXCLUSIVE-OR gate 332 actuates a timing means including a high voltage delay circuit 334. Delay circuit 334 imposes a delay period of about 100 milliseconds. If the inputs of EXCLUSIVE-OR gate 332 have not come into coincidence by this delay time, a malfunction is assumed. Delay circuit 334 then actuates a safety interrupt means which includes high voltage interrupt circuit 336. This safety means disconnects power from the solenoid motor 174 allowing the radial spring 124 to close the shutter and disconnects power from various parts of the system such as the X or gamma ray tube. Thus the shutter circuit includes a plurality of failsafe means for protecting against the shutter opening at an inappropriate time, sticking open, or other shutter malfunctions.

It will be appreciated that numerous other control circuits could be used, such as a system of analog voltage controls instead of the above digital system.

The reference radiation intensity measuring detector can be used with other shutter assemblies or with none. The shutter assembly may be used with other radiation reference level detectors or with none, or with other motor control circuitries or none. And the motor control circuitry and control motors may be used with other shutter mechanisms. Although this type of shutter mechanism, control circuitry, and reference radiation intensity measuring means finds use in the field of computerized tomographic scanning equipment, applications to other fields will be readily apparent.

The invention has been described with reference to the preferred embodiment. Obviously modifications and alterations will occur to others upon reading and understanding this specification. It is intended that all such modifications and alterations be included insofar as they are within the scope of the appended claims or the equivalents thereof.

We claim:

1. An adjustable collimator for forming a fan beam of x or gamma radiation with an adjustable fan angle and thickness comprising:

(a) an inlet opening for receiving a beam of the radiation;

(b) a first generally cylindrical member having a first plurality of slots therein and first non-restrictive passages means, said first plurality of slots comprising slots of more than one length each shorter than the inlet opening and the first non-restrictive passage means, said first non-restrictive passage means being disposed generally 180° around the first cylindrical member from each of the first plurality of slots, said first cylindrical member being disposed adjuacent said inlet opening and mounted for rotatinal movement to bring different ones of said first plurality of slots generally in line with the inlet opening, whereby aligning one of the first plurality of slots with the inlet opening selects the fan angle of the beam;

(c) a second generally cylindrical member having a second plurality of slots therein and second non-restrictive passage means, said second plurality of slots comprising slots of more than one width, each narrower than the inlet opening, the first plurality of slots and the first and second non-restrictive passage means, said second non-restrictive passage means being disposed generally 180° around the second cylindrical member from each of the second plurality of slots, said second cylindrical member being disposed concentric with said first cylindrical member and mounted for rotational movement to bring different ones of the second plurality of slots generally in line with the inlet opening, whereby aligning one of the second plurality of slots with the inlet opening selects the thickness of the fan beam; and (d) control means for rotating said first and second cylindrical members to select the fan angle and thickness of the fan beam.

2. The adjustable collimator of claim 1 further including filter means mounted in at least one of the slots of at least one of said first and second cylindrical members.

3. The adjustable collimator of claim 1 further including at least two radiation sensitive means positioned on opposite sides of said inlet opening and electronic means operatively connected with said radiation sensitive means for producing a signal indicative of the average intensity of radiation on said opposite sides of said inlet opening.

4. The adjustable collimator of claim 1 further including a shutter means for alternatively allowing and prohibiting the passage of radiation through said first and said second cylindrical member, the shutter means comprising a third cylindrical member concentrically mounted with the first and second cylindrical members, said third cylindrical member having a passage therethrough for allowing the passage of radiation through the third cylindrical member when the third cylindrical member is in a first orientation and prohibit the passage of radiation at least when the third cylindrical member is in a second orientation; and shutter control means for rotating said third cylindrical member between said first orientation and said second orientation.

5. The adjustable collimator of claim 4 further including a spring means for biasing said third cylinder to said second orientation.

6. The adjustable collimator of claim 1 wherein said control means a first motor means for rotating said first cylindrical member and a second motor means for rotating said second cylindrical member.

7. The adjustable collimator of claim 6 further including first cam means associated with said first cylindrical member and first switch means operating in cooperation with said first cam means to produce a first signal indicative of the position of said first cylindrical member and second cam means associated with said second cylindrical member and second switch means operating in cooperation with said second cam means to produce a second signal indicative of the position said second cylindrical member.

8. The adjustable collimator of claim 1 further including a filter means mounted near the inlet opening the filter means including at least one filter material and wherein said control means includes means for selectively positioning a filter material in line with said inlet opening.

9. The adjustable collimator of claim 8 wherein at least one of said first and second non-restrictive passage means comprises a plurality of apertures and said filter means includes at least one filter material mounted across at least one of said apertures.

10. The adjustable collimator of claim 1 further comprising intermittent locking means for limiting the position of said second cylindrical member to preselected positions in which one of the second plurality of slots is accurately aligned with said inlet opening.

11. The adjustable collimator of claim 10 wherein said locking means comprises a cam disposed for rotation with said second cylindrical member, said cam having a plurality of indentations, each indentation corresponding to one of said preselected positions and a spring biased means disposed to engage said indentations, whereby as said second cylindrical member is rotated the cam and the spring biased means intermittently lock the second cylindrical member in preselected positions with each of the second plurality of slots aligned with the inlet opening.

12. The adjustable collimar of claim 1 further comprising:
first monitoring means for monitoring the position of said first cylindrical member and producing a first position signal indicative of the position;
selection means for producing a first selection signal indicative of a selected position of said first cylindrical member;
first comparator means for comparing said first position signal and said first selection signal and producing a first drive signal unless the first position signal and first selection signal match; and
first motor means activated by said first drive signal connected to said first cylindrical member to rotate said first cylindrical member to different positions whereby the first motor means moves the first cylindrical member until a selected one of the first plurality of slots is aligned with the inlet opening.

13. The adjustable collimator of claim 12 further including means for defining a patient position, detection means positioned to receive said beam of radiation after passing through said patient position, processing means operatively connected with said detection means for producing a visual representation of radiation attenuation through an object positioned in said patient position.

14. The adjustable collimator of claim 12 further including a shutter means moveable between an open position in which it permits the passage of radiation through the collimator and a closed position in which it prohibits passage of radiation through the collimator, means for producing a shutter open signal, shutter driver means for receiving said shutter open signal and said first drive signal and for moving the shutter means to the open position when the shutter open signal is present and the first drive signal is absent.

15. The adjustable collimator of claim 12 further including a shutter means for alternately permitting and prohibiting the passage of radiation through the collimator, shutter position monitoring means for monitoring the position of the shutter means and producing a shutter position signal indicative of the position of said shutter means, shutter motor means for moving the shutter means between positions in which the passage of radiation through the collimator is permitted and prohibited, shutter control means for producing a shutter control signal for operating the shutter motor means for causing the shutter motor means to move the shutter means to a selected position, shutter position comparison means for receiving the shutter control signal and the shutter position signal and starting a timing means if the shutter is not in the selected position, and safety interrupt means connected to the timing means for cutting off power to generate the beam of radiation if the shutter position fails to come into coincidence with the selected position.

16. The adjustable collimator of claim 12 wherein said first position signal is an X bit signal and said first selection signal is an X bit signal and said first comparator includes X EXCLUSIVE-OR gates, the inputs to each EXCLUSIVE-OR gate being the corresponding bit of said first position signal and said first selection signal, the outputs of the EXCLUSIVE-OR gates are all connected to the inputs of an OR means, said first drive signal being the output of said OR means, where X is an integer.

17. The adjustable collimator of claim 16 wherein the first monitoring means includes X cam means disposed for rotation with said first cylindrical member and X switch means, one interacting with each of the X cam means, each switch means producing an output which is one bit of said first position signal.

18. The adjustable collimator of claim 12 further comprising:
second monitoring means for monitoring the position of said second cylindrical member and producing a second position signal indicative of the position of the second cylindrical member;
selection means for producing a second selection signal indicative of a selected position of said second cylindrical member;
second comparator means for comparing said second position signal and said second selection signal and producing a second drive signal unless the second position signal and second control signal match; and
second motor means activated by said second drive signal connected to said second cylindrical member to rotate said second cylindrical member to different positions whereby the second motor means moves the second cylindrical member until a selected one of the second plurality of slots is aligned with the inlet opening.

19. A tomographic apparatus for examing a body so as to produce an image representing the variation in absorption of penetrating x or gamma radiation over a substantially planar region of said body comprising:
(a) a source of x or gamma radiation;
(b) adjustable collimating means connected with said source for collimating the radiation to form a fan shaped beam of radiation of adjustable size; said collimating means including cylindrical means having a plurality of slots therein, the slots being of more than one size and means for rotating said cylindrical means to cause the radiation to pass through a different one of said slots thereby adjusting the size of said fan beam;
(c) means for scanning said source and said collimating means relating to the body so as to subject said region to radiation from a plurality of directions;
(d) radiation detection means disposed at least opposite said body from said source for producing output signals indicative of the radiation transmitted through said region; and
(e) processing means for processing said output signals to produce said image.

20. The apparatus of claim 19 further including a cylindrical shutter means concentrically and rotatably mounted with said cylindrical means for alternately permitting and prohibiting radiation from said source to pass through said collimating means.

21. The apparatus of claim 19 further including reference detection means for monitoring the intensity of said source of radiation including a plurality of radiation sensitive means mounted between said collimating means and said source and disposed at least adjacent two opposite sides of said fan shaped beam, means operatively connected with said radiation sensitive means and said processing means for producing an indication of the intensity of the radiation at the source whereby the processing means corrects said output signals for fluxuations in the source intensity.

22. The apparatus of claim 19 wherein said cylindrical means includes a plurality of concentrically and rotatably mounted slotted, cylindrical members.

23. A tomographic apparatus for subjecting a planar slice of a body to a beam of penetrating x or gamma radiation and producing an image representative of the variation of attentuation of the beam in the planar slice including:
   (a) means for defining a scan circle;
   (b) an arc of radiation detectors disposed at least partially around the scan circle;
   (c) a source of x or gamma radiation disposed on the opposite side of the scan circle from at least part of said arc of detectors;
   (d) a means enclosing said source of radiation;
   (e) an aperture in said enclosing means positioned such that radiation from the radiation source passing through said aperture passes through said planar slice of the body and strikes at least one of said radiation detectors;
   (f) radiation intensity measuring means including a plurality of radiation sensitive elements positioned on at least two sides of said aperture for providing an indication of average radiation intensity at said aperture;
   (g) adjustable collimation means for collimating the radiation to form a fan shaped beam of adjustable size, said adjustable collimation means being disposed for adjusting the cross section of the beam; said collimation means including generally cylindrical means having a plurality of slots therein, the slots being of more than one size and means for rotating said generally cylindrical means to cause the radiation to pass through a different one of said slots thereby adjusting the size of said fan beam; and
   (h) processing means operatively connected to said radiation detectos and said radiation intensity measuring means for producing the image.

24. The tomographic apparatus of claim 23 wherein said radiation sensitive elements includes a pair of scintillation crystals which are positioned adjacent said aperture and wherein said radiation intensity measuring means further includes a light conducting means connected with the pair of scintillation crystals, transducer means connected with said light conducting means to produce an electric signal for the processing means which signal is indicative of the average intensity received by the scintillation crystals.

25. The tomographic apparatus of claim 23 wherein said radiation intensity measuring means further comprises:
   a light conducting means branched to form a light conductive base and at least two light conducting arms;
   said plurality of radiation sensitive elements comprises scintillation crystal means mounted on each arm for converting incident radiation into light;
   a transducer means for converting light into electrical signals, said transducer means being disposed adjacent the light conductive base; and
   light shielding means for limiting the passage of light into said light conducting means substantially to light from said scintillation crystal means.

26. The tomographic apparatus of claim 25 wherein said light shielding means is at least one layer of opaque material enclosing said scintillation crystal means, said light conducting means, and said transducer means.

27. The tomographic of claim 25 wherein said light conducting means has two arms arranged substantially in the shape of a tuning fork.

28. The tomographic apparatus of claim 27 wherein said scintillation crystal means is a pair of scintillation crystals one mounted on each of said two arms; said scintillation crystals mounted parallel to each other, and spaced apart by substantially the width of a beam of radiation.

* * * * *